United States Patent [19]

Gergel

[11] 3,865,813

[45] Feb. 11, 1975

[54] THIOUREA-ACYLATED POLYAMINE REACTION PRODUCT

[75] Inventor: William C. Gergel, Mayfield Heights, Ohio

[73] Assignee: The Lubrizol Corporation, Cleveland, Ohio

[22] Filed: Sept. 2, 1970

[21] Appl. No.: 69,160

Related U.S. Application Data

[63] Continuation-in-part of Ser. No. 696,159, Jan. 8, 1968, abandoned.

[52] U.S. Cl..... 260/239.3 R, 252/47.5, 260/326.42, 260/326.5 F, 44/63, 44/66
[51] Int. Cl............................................. C01m 1/38
[58] Field of Search...................... 252/47.5, 51.5 A; 260/239.3 R, 309.7, 326.3, 552 R, 561 S

[56] References Cited
UNITED STATES PATENTS
3,312,619  4/1967  Vineyard .......................... 252/47.5

OTHER PUBLICATIONS
Kirk–Othmer, "Encycl. of Chemical Technology," 2nd Edn., (1965), Vol. 7, pages 31 and 32.

*Primary Examiner*—W. Cannon
*Attorney, Agent, or Firm*—Daniel N. Hall; James W. Adams, Jr.

[57] ABSTRACT

Process for post-treating certain ashless dispersants prepared from high molecular weight carboxylic acid acylating agents and polyamines with thiourea and certain reaction products thereby produced. The products are useful additives for lubricants and fuels.

1 Claim, No Drawings

THIOUREA-ACYLATED POLYAMINE REACTION PRODUCT

This application is a continuation-in-part application of Ser. No. 696,159 filed Jan. 8, 1968, now abandoned.

This invention relates to a novel chemical process and to certain reaction products produced by the process. Particularly, the invention is directed to a process whereby oil-soluble acylated polyamines are post-treated with thiourea and to novel sulfur-containing reaction-products thereby produced.

As is well-known, recent years have seen the development of a new family of lubricant and fuel additives generally produced by reacting mono- or polycarboxylic acids, anhydrides, halides, and other equivalent carboxylic acid acylating agents with various polyamines. Such additives are disclosed, for example, in U.S. Pat. Nos. 3,172,892; 3,291,666; 3,272,746; 3,340,190; and 3,341,542. The acylated amines thus produced are primarily employed as sludge-dispersants in motor oils for internal combustion engines although they are also commercially utilized as fuel additives in petroleum distillate fuels such as gasoline, kerosene, diesel fuels, and the like. As fuel additives, these acylated amines serve to promote engine and carburetor cleanliness, etc.

It has now been determined that additional useful products can be prepared by post-treating the foregoing acylated amines with thiourea. The post-treated products themselves are useful as additives for lubricating oils, transmission oils, and fuels in the same manner as the products from which they are prepared. These thiourea-treated products, however, are characterized by improved properties such as greater oxidation stability.

The above-identified patents disclose various acylated polyamines useful as intermediates in the present invention and processes for preparing them. Accordingly, these patents are herein incorporated by reference to avoid having to reiterate herein what is now well-known.

In accordance with the foregoing, it is a principal object of the present invention to provide a novel chemical process.

Another object is to provide a process comprising the step of post-treating an oil-soluble, carboxylic acid-acylated polyamine reaction product with thiourea.

A further object of this invention is to provide a process for preparing sulfur-containing compositions useful as additives in lubricating oils and fuels.

A still further object is to provide novel compositions of matter produced by post-treating certain oil-soluble, carboxylic acid-acylated polyamine products with thiourea.

The manner in which these and other objects may be achieved will become apparent from the following description of the invention.

The acylated polyamine starting materials contemplated by the present invention can be generically described as oil-soluble acylated nitrogen compounds characterized by the presence within their structure of (A) a substantially saturated hydrocarbon-substituted carboxylic acid polar group selected from the class consisting of carboxylic acid acyl, acylimidoyl, and acyloxy radicals wherein the substantially saturated hydrocarbon-substituted substituent contains at least about fifty aliphatic carbon atoms and (B) a nitrogen-containing group characterized by a nitrogen attached directly to said carboxylic acid polar group.

The carboxylic acid polar groups are derived from mono- and polycarboxylic acids (or the equivalent acylating agents such as the halides and anhydrides) characterized by the presence within their structure of a substantially hydrocarbon group containing at least about 50 aliphatic carbon atoms. Moreover, these polar groups are substantially saturated; that is, at least about 95% of the total number of carbon-to-carbon covalent linkages therein are saturated linkages. Preferably, no more than about 2% of these linkages are other than saturated and all may be saturated. The minimum carbon content is important with regard to the sludge-dispersing capabilities of the final products while the presence of too great a number of non-saturated carbon-to-carbon linkages renders the intermediates and final products susceptible to oxidation, degradation, and/or polymerization.

The hydrocarbon substituent of the carboxylic acid polar groups preferably should be substantially free from large oil-solubilizing pendant groups, i.e., groups having more than about six aliphatic carbon atoms. While some large oil-solubilizing pendant groups may be present, they preferably should be present in amounts such that there is less than about one such group for every 25 aliphatic carbon atoms in the main hydrocarbon chain.

The substantially hydrocarbon substituent may contain polar substituents other than the carboxylic aacid groups discussed abouve provided, however, that the polar substituents are not present in proportions sufficiently large to alter significantly and hydrocarbon character of the radical. The polar substituents are exemplified by halo (e.g., chloro, bromo) oxo, oxy, thio, formyl, nitro, etc. The upper limit with respect to the proportion of such polar substituents in the radical is approximately 10% based on the weight of the hydrocarbon portion of the carboxylic acid polar groups.

The sources of the hydrocarbon groups include principally the high molecular weight substantially saturated petroleum fractions and substantially saturated olefin polymers, particularly polymers of monoolefins having from two to about thirty carbon atoms. The especially useful polymers are the homopolymers, copolymers, and interpolymers of 1-monoolefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene, 3-methyl-1-butene with 1-octene; 3,3-dimethyl-1-pentene with 1-hexene; isobutene with styrene and piperylene; etc.

The relative proportions of the monoolefins to the other monomers in the interpolymers influence the stability and oil-solubility of the final acylated nitrogen compositions derived from such interpolymers. Thus, for reasons of oil-solubility and stability the interpolymers contemplated for use in this invention should be substantially aliphatic and substantially saturated, i.e., they should contain at least about 80%, preferably at least about 95%, on a weight basis of units derived from the aliphatic monoolefins and no more than about 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include copolymer of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

Another source of the substantially hydrocarbon radical comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having molecular weights of about 700-5,000 is preferred. Higher molecular weight olefin polymers having molecular weights from about 10,000 to about 100,000 or higher impart viscosity index improving properties to the acylated polyamine products produced by the process of this invention. In many instances, the use of such higher molecular weight olefin polymers is desirable. On the other hand, olefin polymers having molecular weights less than about 700 are not useful although where the polyamine is acylated by more than one carboxylic acid, some of the carboxylic acid groups may have substantially hydrocarbon groups of less than 700 molecular weight as long as one of the carboxylic acid polar groups has a substantially hydrocarbon substituent having a molecular weight of at least about 700.

The relatively polar group of the acylated polyamine intermediates is selected from the class consisting of carboxylic acyl, acylimidoyl, and acyloxy radicals. These radicals have the following structural configurations, respectively:

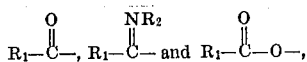

wherein $R_1$ represents the substantially hydrocarbon substituent described hereinbefore and $R_2$ represents the residue of a polyamine.

The polyamines from which the intermediates are derived are characterized by at least two radicals having the formula $$-\overset{|}{N}H.$$

The two remaining valences of the nitrogen atom of the above

radical preferably are satisfied by hydrogen, amino, or organic raadicals bonded to said nitrogen atom through direct carbon-to-nitrogen linkages.

A preferred group of polyamines are the ethylene polyamines. They are described in some detail under the heading "Ethylene Amines" in "Encyclopedia of Chemical Technology" Kirk and Othmer, Volume 5, pages 898–905, Interscience Publishers, N.Y. (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. An especially useful alkylene polyamine for reasons of economy as well as effectiveness of the products derived therefrom is a mixture of ethylene polyamines prepared by the reaction of ethylene chloride and ammonia and having an average of three to seven nitrogen atoms per molecule.

As indicated previously, the nitrogen-containing group in the acylated polyamine intermediates is characterized by a nitrogen atom attached directly to the carboxylic acid polar group. It is apparent to those skilled in the art that the linkage between a nitrogen atom and an acyl radical is representative of an amide or an imide structure, that the linkage between a nitrogen atom and an acylimidoyl radical is representative of an amidine structure, and that the linkage between a nitrogen atom and an acyloxy radical is representative of an amine carboxylic acid salt structure. Thus, the acylated polyamine intermediates of this invention are characterized by amide, imide, amidine, or salt linkages and in many instances a mixture of such linkages. Those containing two such linkages separated by a lower alkylene radical (i.e., one having less than about six carbon atoms), such as are derived from succinic, glutaric, or adipic radicals, are especially preferred in this invention.

A conventional method for preparing the acylated polyamines comprises reacting the acid-producing compound by the presence within its structure of at least one acid-producing group having the formula

wherein X is selected from the class consisting of halogen, hydroxy, hydrocarbon-oxy, and acyloxy with a polyamine characterized by the presence within its structure of at least two radicals of the formula

As discussed above the process is usually carried out by heating a mixture of the acid-producing compound and the polyamine at a temperature above about 80°C., preferably within the range from about 100°C. to about 250°C. However, when an acid or anhydride is employed in reactions with an amino nitrogen-containing reactant, the process may be carried out at a lower temperature such as room temperature to obtain products having predominately salt linkages or mixed salt-amide linkages. The acylated amines are generally prepared by heating above 80°C. to produce predominantly amide, imide, or amidine linkages. The use of a solvent such as benzene, toluene, naphtha, mineral oil, xylene, n-hexane, or the like is often desirable in the above process to facilitate the control of the reaction temperature.

The above process involves a reaction between the acid-producing group with

radical resulting in the direct attachment of a nitrogen atom to a carboxylic acid polar radical, (i.e., acyl, acylimidoyl, or acyloxy radical) derived from the acid-producing group. The linkage formed between the nitrogen atom and the polar radical may be that of a salt, amide, imide, or amidine radical as mentioned supra. In most instances, the product of the above process contains a mixture of linkages representative of such radicals. The precise relative proportions of such radicals in the product usually are not known as they depend to a large measure upon the identity and/or quantity of the acid-producing groups and the polyamines involved in the reaction and also upon the environment (e.g., temperature) in which the reaction is carried out. To illustrate, the reaction involving an acid or anhydride group with an amino nitrogen-containing radical at relatively low temperatures such as below about 60°C. results predominantly in a salt linkage

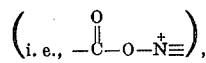

but at relatively high temperatures such as above about 80°C., e.g., 80°-250°C., results predominantly in an amide, imide, or amidine linkage

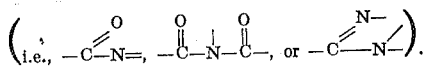

The products obtained by the above process, irrespective of the nature or relative proportions of the linkages present therein, all are known to be effective additives in lubricating oils and petroleum fuels.

While the acid-producing compounds used to prepare the acylated polyamines include mono-carboxylic and poly-carboxylic acids, acid halides, esters, and anhydrides and mixtures thereof the substantially saturated, aliphatic hydrocarbon-substituted succinic acids and anhydrides are especially preferred for use as the acid-producing reactant in this process due to the particular effectiveness of the products obtained from such compounds as additives in hydrocarbon oils. The succinic compounds are readily available from the reaction of maleic anhydride with a high molecular weight olefin or a chlorinated hydrocarbon such as a chlorinated olefin polymer described hereinabove. The reaction involves merely heating the two reactants at a temperature about 100°-200°C. The product from such a reaction is an alkenyl succinic anhydride. The alkenyl group may be hydrogenated to an alkyl group. The anhydride may be hydrolyzed by treatment with water or steam to the corresponding acid. The anhydrides or the acids may be converted to the corresponding acid halide by reacting with a phosphorus halide, or an ester by reaction with lower alkanols, e.g., ethanol.

In lieu of the high molecular weight olefins or chlorinated hydrocarbons, other high molecular weight hydrocarbons containing an activating polar substituent, i.e., a substituent which is capable of activating the hydrocarbon molecule in respect to reaction with maleic acid or anhydride may be used in the above-illustrated reaction for preparing the succinic compounds. Such polar substituents may be illustrated by sulfide, disulfide, nitro, mercaptan, bromine, ketone, and aldehyde radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polar-substituted hydrocarbon at a temperature usually within the range from about 100°C. to about 200°C.

Polycarboxylic acids and derivatives thereof having more than two carboxylic radicals per molecule which are contemplated for use in this invention are those containing at least about 50 aliphatic carbon atoms per molecule and furthermore, at least about 25 aliphatic carbon atoms per each carboxylic radical. Such acids may be prepared by halogenating a high molecular weight hydrocarbon such as the olefin polymer described hereinabove to produce a poly-halogenated product, converting the poly-halogenated product to a poly-nitrile, and then hydrolyzing the poly-nitrile. They may be prepared also by oxidation of a high molecular weight polyhydric alcohol with potassium permanganate, nitric acid, or a like oxidizing agent. Another method for preparing such polycarboxylic acids involves the reaction of an olefin or a polar-substituted hydrocarbon such as a chloro-polyisobutene with an unsaturated poly-carboxylic acid such as 2-pentene-1,3,5-tricarboxylic acid obtained by dehydration of citric acid.

The monocarboxylic acids and derivatives thereof may be obtained by oxidizing a monohydric alcohol with potassium permanganate or by reacting a halogenated high molecular olefin polymer with a ketone. Another convenient method for preparing the monocarboxylic acids involves the reaction of metallic sodium with an acetoacetic ester of a malonic ester of an alkanol to form a sodium derivative of the ester and the subsequent reaction of the sodium derivative with a halogenated high molecular weight hydrocarbon such as brominated wax or brominated polyisobutene. Still other methods are disclosed in U.S. Pat. Nos. 3,219,666 and 3,340,281.

The monocarboxylic and polycarboxylic acid anhydrides are obtained by dehydrating the corresponding acids. Dehydration is readily accomplished by heating the acid to a temperature above about 70°C. preferably in the presence of a dehydration agent, e.g., acetic anhydride. Cyclic anhydrides ar usually obtained from polycarboxylic acids having the acid radicals separated by no more than three carbon atoms such as substituted succinic or glutaric acids, whereas linear polymeric anhydrides are obtained from polycarboxylic acids having the acid radicals separated by four or more carbon atoms.

The acid halides of the monocarboxylic and polycarboxylic acids can be prepared by the reaction of the acids or their anhydrides with a halogenation agent such as phosphorus tribromide, phosphorus pentachloride, or thionyl chloride. The acylating agents of such acids can be prepared simply by the reaction of the acids or their anhydrides with a lower alkanol such as methanol, ethanol, etc. The esterification is usually promoted by the use of an alkaline catalyst such as sodium hydroxide or sodium alkoxide or an acidic catalyst such as sulfuric acid.

Another method for preparing the acylated nitrogen compositions of this invention involves first reacting the polyamine with an ethylenically-unsaturated acid-producing compound and then incorporating a large hydrocarbon substituent (i.e., having at least about 50 aliphatic carbon atoms) into the resulting intermediate by reacting the intermediate with a high molecular weight hydrocarbon reactant, such as an olefin, a chlorinated hydrocarbon, or a polar substituted hydrocarbon illustrated previously. The acid-producing compound useful in this process is also characterized by at least one

group as defined above. The acid-producing compound may be maleic acid, itaconic acid, acrylic acid, aconitic acid, methacrylic acid, chloromaleic acid, alpha-chloroacrylic acid, alpha-butylacrylic acid, crotonic acid, citraconic acid, mesaconic acid, maleic anhydride, chloromaleic anhydride, maleamic acid, acrylyl chloride, acrylyl bromide, methacrylic acid, alpha-propylacrylyl chloride, methyl acrylate, ethyl methacrylate, dimethyl maleate, diethyl itaconate, dibutyl maleate, methyl chloroacrylate, dimethyl citraconate, etc. Preferably the acid-producing compounds have less than eight carbon atoms and have an ethylenically unsaturated grouping

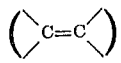

adjacent to at least one

group.

The intermediate produced by such reaction is thus characterized by the presence therein of an amide, imide or amidine linkage or a mixture of such linkages. A convenient method of incorporating a high molecular weight hydrocarbon substituent into the nitrogen-containing intermediate involves reacting the intermediate with a high molecular weight reactant (e.g., olefin, chlorinated hydrocarbon such as a chlorinated olefin polymer, or a polar-substituted high molecular weight hydrocarbon) at a temperature above about 100°C., preferably below about 200°C. Such high molecular weight reactant is as described previously in connection with the preparation of the high molecular weight succinic acid-producing compounds of this invention.

The relative proportions of the acid-producing compounds and the polyamines in the reaction mixture are such that approximately 1–1.5 equivalents of the polyamine is used for each equivalent of the acid-producing compound used. In this regard it will be noted that the equivalent weight of the nitrogen-containing reactant is based upon the number of the nitrogen-containing radicals defined by the structural configuration

Similarly the equivalent weight of the acid-producing compound is based upon the number of the acid-producing radicals defined by the structural configuration

Thus, ethylene diamine has two equivalents per mole; a succinic acid or ester has two equivalents per mole, etc.

The following examples illustrate the preparation of the acylated polyamines. As used herein all parts and percentages express parts by weight or percent by weight unless otherwise indicated.

EXAMPLE 1

A polyisobutenyl succinic anhydride having an acid number of 105 and an equivalent weight of 540 is prepared by the reaction of a chlorinated polyisobutylene (having an average molecular weight of 1,050 and a chlorine content of 4.3%) and maleic anhyride. To a mixture of 300 parts by weight of the polyisobutenyl succinic anhydride and 160 parts by weight of mineral oil there is added at 65°–95°C. an equivalent amount (25 parts by weight) of Polyamine H, an ethylene amine mixture having an average composition corresponding to that of tetraethylene pentamine and available from Carbide and Carbon under the trade name "Polyamine H." This mixture then is heated to 150°C. to distill all of the water formed in the reaction. Nitrogen is bubbled through the mixture at this temperature to insure removal of the last traces of water. The residue is diluted by 79 parts by weight of mineral oil and this oil solution found to have a nitrogen content of 1.6%.

EXAMPLE 2

To a solution of 1,000 grams (1.87 equivalents) of the polyisobutenyl succinic anhydride of Example 1 in 500 grams of mineral oil there is added at 85°–95°C. 70 grams (1.87 equivalents) of a mixture of ethylene polyamines prepared by mixing commercially available amines Polyamine H, Dow Amine E, diethylene triamine, and triethylene-tetramine). The mixture then is heated at 150°–165°C. for 4 hours, blowing with nitrogen to aid in the removal of water. The residue is diluted with 200 grams of mineral oil and the oil solution found to have a nitrogen content of 1.4%.

EXAMPLE 3

A polypropenyl succinic anhydride is prepared by the reaction of a chlorinated polypropylene (having a molecular weight of about 900 and a chlorine content of 4%) and maleic anhydride at 200°C. The product has an acid number of 75. To a mixture of 390 grams (0.52 equivalent) of this polypropenyl succinic anhydride, 500 grams of toluene, and 170 grams of mineral oil there is added portionwise 22 grams (0.52 equivalent) of Polyamine H. The reaction mixture is heated at reflux temperature for 3 hours and water removed from an azeotrope with toluene. The toluene then is removed by heating to 150°C./20 millimeters. The residue was found to contain 1.3% of nitrogen.

EXAMPLE 4

A substituted succinic anhydride is prepared by reacting maleic anhydride with a chlorinated copolymer of isobutylene and styrene. The copolymer consists of 94 parts by weight of isobutylene units and 6 parts by weight of styrene units, has an average molecular weight of 1,200, and is chlorinated to a chlorine content of 2.8% by weight. The resulting substituted succinic anhydride has an acid number of 40. To 710 grams (0.51 equivalent) of this substituted succinic anhydride and 500 grams of toluene there is added portionwise 22 grams (0.51 equivalent) of Polyamine H. The mixture is heated at reflux temperature for 3 hours to remove by azeotropic distillation all of the water formed in the reaction, and then at 150°C./20 millimeters to remove the toluene. The residue contains 1.1% by weight of nitrogen.

EXAMPLE 5

A substituted succinic anhydride is prepared by reacting maleic anhydride with a chlorinated copolymer of isobutylene and isoprene. The copolymer consists of 99 parts by weight of isobutylene units and 1% by weight of isoprene units. The molecular weight of the copolymer is 28,000 and the chlorine content of the chlorinated copolymer is 1.95%. The resulting alkenyl succinic anhydride had an acid number of 54. To a mixture of 228 grams (0.22 equivalent) of an oil solution of this alkenyl succinic anhydride, 58 grams of additional mineral oil, 500 grams of toluene and 9.3 grams (0.22 equivalent) of Polyamine H is heated at 110°-120°C. for 3 hours, water being removed from an azeotrope with toluene. When all of the water has thus been removed the toluene is distilled by heating to 150°C./20 millimeters. The residue is found to have a nitrogen content of 1.1%.

EXAMPLE 6

A mixture of 1,110 grams of polyisobutene-substituted succinic anhydride (having an acid number of 109 and prepared from a reaction of maleic anhydride and chlorinated polyisobutylene having an average molecular weight of 850 at 200°C.), 105 grams of anthranilic acid and 844 grams of mineral oilis heated at 100°C. oil is 2 hours. The mixture is cooled and is mixed with 72 grams of a mixture consisting of 75% by weight of triethylene tetramine and 25% by weight of diethylenetriamine at 60°-80°C. The resulting mixture is heated at 150°-155°C. for 5 hours while being purged with nitrogen. The residue is found to have a nitrogen content of 1.72%.

EXAMPLE 7

A polypropylene-substituted succinic anhydride having an acid number of 84 is prepared by the reaction of a chlorinated polypropylene having a chlorine content of 3% and molecular weight of 1,200 maleic anhydride. A mixture of 813 grams of the polypropylene-substituted succinic anhydride, 50 grams of a commercial ethylene amine mixture having an average composition corresponding to that of tetraethylene pentamine and 566 grams of mineral oil is heated at 150°C. for 5 hours. The residue is found to have a nitrogen content of 1.18%.

According to the process of the present invention, these acylated polyamines are reacted with thiourea at temperatures of from about 100°C. up to the decomposition temperature of the reactant having the lowest decomposition temperature. Generally, the reaction is conducted at a temperature of about 100°-200°C. and preferably at 120°-190°C. The acylated polyamine and thiourea are employed in the reaction mixture in amounts such that the equivalent ratio of thiourea to acylated polyamines is about 1:3 to about 3:1, usually about 1-2:1-1.5. For purposes of this invention, thiourea is deemed to have two equivalents per mole and the acylated polyamines has a number of equivalents equal to the number of amino nitrogens in the polyamine moiety thereof. Thus, acylated tetraethylene pentamine has five equivalents per mole of acylated polyamine.

The products produced in the process of the present invention are of unknown structure. As discussed above, the acylated polyamines themselves are generally mixtures of amides, imides, amidines, and perhaps, amine salts. Since it is possible for thiourea to react with two different acylated polyamines, it is obvious that the reaction products resulting from the claimed process are also mixtures. Moreover, since the polyamine reactant is a mixture of various commercially available ethylene polyamine mixtures and includes diethylene triamine, triethylene tetramine, tetraethylene pentamine, pentaethylene hexamine, aminoethyl piperazine, and the like, it is impossible to establish the exact identity of the reaction products.

However, it can be postulated that the reaction products could, depending on the particular acylated polyamines and reaction conditions, include components of the following types:

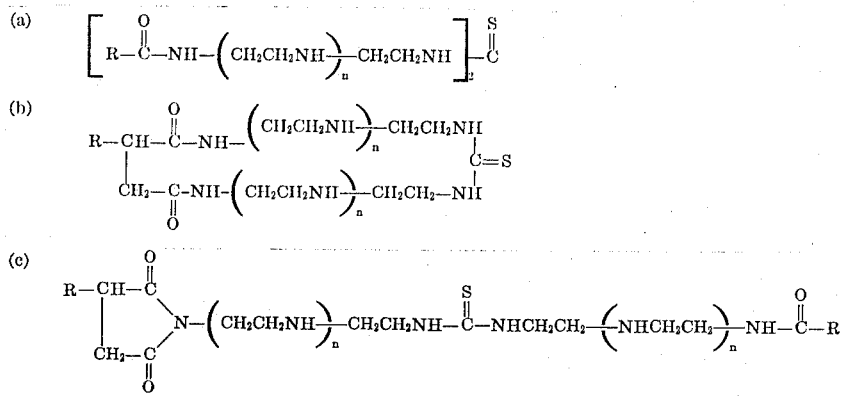

(d) 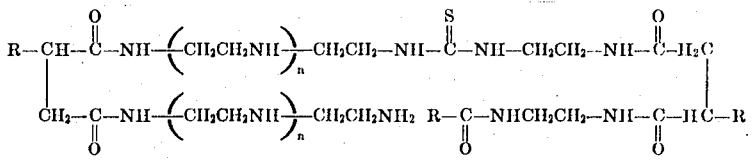

where R is the residue of a carboxylic acid and $n$ is zero to eight. Obviously, many other structures can explain the reaction and applicant does not maintain that any or all of the postulated structures actually exist.

As seen from Examples 1–7 above, the acylated polyamines are generally prepared in the presence of an inert diluent, usually lubricating oils, although other diluents such as benzene, alkyl benzenes such as toluene, halobenzenes such as chlorobenzene, hexane, heptane, cyclohexane, naphthas, mixtures of two or more of these, and the like can also be employed as diluents. It is usually desirable to employ the acylated polyamine product in the inert diluent in which it is prepared since the diluent can then serve as a reaction medium in the subsequent post-treatment with thiourea if desired. Additional diluent can be added to facilitate mixing, etc., in the reaction with thiourea. Suitable diluents include aromatic, aliphatic, cycloaliphatic, hydrocarbons of the type illustrated above. However, the mineral lubricating oils constitute the preferred diluent for preparing the acylated polyamines and for the subsequent thiourea post-treatment.

After the post-treatment with thiourea is completed, the resulting reaction mixtures are generally filtered to improve their clarity. The resulting filtrate is then suitable for incorportion into lubricating oil and fuel compositions.

The following examples illustrate the process of the present invention.

EXAMPLE I

A reaction mixture comprising (1) 1,907 parts of an oil-solution (about 41% by weight mineral oil with a 1.5% nitrogen content based on the total weight thereof of an acylated polyamine prepared by reacting at about 150°C. a mixture of commercial ethylene polyamines of the type identified in Example 2 with a polyisobutenyl-substituted succinic anhydride having an average molecular weight of about 1,100–1,200 in an equivalent ratio of anhydride to amine of about 1:1 and (2) 69 parts of thiourea in a glass reaction vessel is heated from room temperature to 80°C. and held at 80°C. for 2 hours. Thereafter, the mixture is heated to 150°–155°C. and maintained at that temperature for 4 hours, the last hour of which the mixture is blown with nitrogen at 1.5 cubic feet per hour. The mixture is filtered producing 1,598 parts of a reddish brown filtrate. The reaction product is characterized by a nitrogen content of 2.25% and a sulfur content of 1.48%.

EXAMPLE II

A mixture comprising 4,500 parts of an oil-solution (40% mineral oil solution having a nitrogen content of 1.9%) of an acylated polyamine of the type described in Example I (except that the equivalent ratio of anhydride to polyamine is 1:1.5) and 513 parts of thiourea is heated from room temperature to about 175°C. over a 5-hour period and is subsequently maintained at 175°–185°C. for about 4 hours. Nitrogen is bubbled through the mass during the heating phase. The resulting mixture is then filtered at 175°–180°C. The reaction product is characterized by a sulfur content of about 2.2%.

EXAMPLE III a. Seventy-four parts of thiourea is added to a preformed, 40% oil solution of an acylated ethylene polyamine mixture. The acylated polyamine mixture had been prepared as discussed and exemplified above by reacting polyisobutenyl (average molecular weight 800–1,100)-substituted succinic anhydride with a mixture of ethylene polyamines characterized by an overall nitrogen content of 34.25% by weight in an equivalent ratio of anhydride to polyamine of about 1:1.5. The thiourea-containing mixture is heated at about 160°–180°C. for about 7.5 hours and then filtered. The filtrate is a 39% oil solution of the desired product which is characterized by a nitrogen content of 2.38% by weight and a sulfur content of about 1.38% by weight.

b. The general procedure of (a) is repeated using 1,139 parts of the 40% oil solution of polyisobutenyl-substituted succinic anhydride and 130 parts thiourea. The filtrate is characterized by nitrogen content of 3.85% and a sulfur content of 2.72%.

c. The general procedure of (a) is repeated using 1,872 parts of the 40% oil solution of polyisobutenyl-substituted succinic anhydride and 32 parts thiourea. The filtrate is characterized by a nitrogen content of 2.06% and a sulfur content of 0.67%.

Examples I–III are obviously illustrative and in no way limiting. By substituting other acylated polyamines of the type described in detail herein above for those employed in these examples other embodiments of the present invention are readily realized. Furthermore, the amount of thiourea employed can obviously be varied within the range set forth hereinbefore.

The thiourea post-treated acylated polyamine resulting from the process of the present invention are generally employed in lubricating oils in amounts ranging from about 0.1% to about 15% by weight. The optimum amount for a particular application will depend upon the environment in which the oil is to be used (e.g., transmission oil additive, crankcase oil additive, etc.) and the nature and amount of other additives employed in the composition. For example, the crankcase lubricating compositions for gasoline-fueled internal combustion engines will normally contain from about 0.5 to about 5% of the products of this invention whereas lubricants for diesel engines might contain from 10% to 15% by weight of the additive. Transmission lubricants will normally contain from about 0.5% to about 5% of the reaction products. When employed as fuel additives, the concentration of the products usually will range from about 0.1% to about 2.0% by weight of the total composition.

It is contemplated that the products of this invention will be employed in conjunction with other known lubricating additives such as ash-containing detergents, viscosity index improving agents, pour point depressants, anti-foam agents, extreme pressure additives, rust inhibitors, demulsifiers, deicers, and the like. These additives are well-known in the art and need no detailed discussion herein. Generally, when these other additives are present they will be employed in amounts ranging from about 0.01% to about 20% by weight depending on the identity of the other additives and the ultimate use of the lubricating composition. The following illustrates typical lubricating compositions employing the reaction products produced by the process of this invention.

EXAMPLE A

Commercial automatic transmission fluid containing 0.5% by weight of the product of Example I.

EXAMPLE B

SAE 10W–30 mineral lubricating oil containing 1.5% by weight of the product of Example III(b).

EXAMPLE C

SAE 30 mineral lubricating oil containing 2% of the product of Example 1, 1% of the product of Example III(a), 0.1% of phosphorous as the zinc salt of a mixture of equimolar amounts of di-isopropyl-phosphorodithioic acid and di-n-decylphosphorodithioic acid, and 2.5% of sulfate ash as a basic barium detergent prepared by carbonating at 150°C. a mixture comprising mineral oil, barium di-docecyl benzene sulfonate and 1.5 moles barium hydroxide in the presence of a small amount of water and 0.7 mole of octylphenol as the promoter.

EXAMPLE D

SAE 20–30 mineral lubricating oil containing 1% of the product of Example 1, 1% of the product of Example II, 0.1% of phosphorous as zinc di-n-hexylphosphorodithioate, 10% of a chlorinated paraffin wax having a chlorine content of 40%, 2% of di-butyltetrasulfide, 2% of sulfurized dipentene, 0.2% of oleyl amide, 0.003% of an anti-foam agent, 0.02% of a pour point depressant, and 3% of a viscosity index improver.

The oxidation stability and sludge-dispersing capabilities of the reaction products of the process of this invention is demonstrated by evaluating these properties in automatic transmission lubricants by the following general procedure: one 2 × 9.5 inch sandblasted 8 mesh iron screen, one 2 × 8 inch sandblasted 8 mesh copper screen, and two lead strips (each 2.5 × 0.5 × 0.0625 inch) are immersed in a 350 -gram sample of the composition to be evaluated. Thereafter, the sample is heated at 150°C. while air is bubbled through the sample at a constant rate for 136 hours. Samples (15 cc.) are taken at periodic intervals and their viscosity determined. The viscosity is then converted to a percentage increase of the original viscosity of the sample before the test. The increase in viscosity is an indication of the oxidation degradation of the sample and reduced sludge-dispersing capabilities. Thus, a low percentage increase in viscosity is desired. Test results obtained by this procedure are presented in the following table.

TEST DATA

| Additive | Description | Additive Amount % by wt. | Test Results At End of Indicated Hours of Testing (% Increase In Viscosity Over Initial Viscosity At Start of Test) | | | | | | |
|---|---|---|---|---|---|---|---|---|---|
| | | | 64 | 72 | 88 | 96 | 112 | 120 | 136 |
| (Composition X) | | | | | | | | | |
| (1) Reaction Prod. of 2 | | 1.5 | 29 | 27 | 38 | 47 | 67 | 75 | 123 |
| (2) Reaction Prod. of 2 | | 1.5 | 35 | 38 | 50 | 58 | 85 | 100 | 195 |
| Additive A | | 2.0 | | | | | | | |
| (3) Reaction Prod. of 2 | | 1.5 | 35 | 35 | 50 | 56 | 79 | 93 | 168 |
| Additive A | | 3.0 | | | | | | | |
| (4) Reaction Prod. of Ex.I | | 1.5 | 24 | 27 | 37 | 42 | 56 | 66 | 95 |
| (5) Reaction Prod. of Ex. I | | 2.0 | 29 | 31 | 37 | 40 | 50 | 55 | 75 |
| Additive A | | 2.0 | | | | | | | |
| (6) Reaction Prod. of Ex. I | | 2.0 | 30 | 35 | 42 | 46 | 59 | 61 | 80 |
| Additive A | | 3.0 | | | | | | | |
| (7) Reaction Prod. of Ex. II | | 1.5 | 29 | 29 | 35 | 47 | 57 | 63 | 86 |
| Additive A | | 2.0 | | | | | | | |
| (Composition Z) | | | | | | | | | |
| (8) Additive B | | 1.5 | 23 | 27 | 35 | 41 | 63 | 74 | 143 |
| (9) Reaction Prod. of Ex. I | | 2.0 | — | — | 28 | 37 | 39 | 53 | 73 |
| (10)Additive C | | 1.5 | — | — | 30 | 38 | 44 | 65 | 116 |
| (11)Additive C | | 2.0 | — | — | 25 | 33 | 37 | 43 | 58 |

Additive A: Commercially Available Transmission Fluid Additive.
Additive B: An additive prepared by post-treating an acylated polyamine with carbon disulfide.
Additive C: Product similar to reaction product of Example 1 except twice the amount of thiourea is employed.
Composition X and Z are identical automatic transmission lubricating oils except for the additives.

What is claimed is:
1. The process comprising reacting (A) a polyisobutenyl-substituted succinic acid acylated ethylene polyamine mixture characterized by an equivalent ratio of acid to polyamine of about 1:1 to 1:1.5, wherein the polyisobutenyl substituent has an average molecular weight of about 800–1,100, and (B) thiourea, the total amount of thiourea employed in the reaction mixture being such that the ratio of equivalents of thiourea to acylated ethylene polyamine is about 1–2:1–1.5.

* * * * *